(12) United States Patent
Ishikawa et al.

(10) Patent No.: US 11,176,332 B2
(45) Date of Patent: Nov. 16, 2021

(54) LINKING CONTEXTUAL INFORMATION TO TEXT IN TIME DEPENDENT MEDIA

(71) Applicant: International Business Machines Corporation, Armonk, NY (US)

(72) Inventors: Shunsuke Ishikawa, Tokyo (JP); Yasuyuki Tominaga, Saitama (JP); Hiroaki Uetsuki, Machida (JP); Asako Ono, Tokyo (JP); Tohru Hasegawa, Tokyo (JP); Issei Yoshida, Tokyo (JP); Kenta Watanabe, Soka (JP)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/535,266

(22) Filed: Aug. 8, 2019

(65) Prior Publication Data
US 2021/0042393 A1 Feb. 11, 2021

(51) Int. Cl.
*G06F 40/40* (2020.01)
*G06K 9/46* (2006.01)
*G06F 16/483* (2019.01)
*G10L 13/00* (2006.01)

(52) U.S. Cl.
CPC ......... *G06F 40/40* (2020.01); *G06F 16/483* (2019.01); *G06K 9/4604* (2013.01); *G10L 13/00* (2013.01)

(58) Field of Classification Search
CPC .......... G06F 40/20; G06F 40/30; G06F 40/40; G06F 16/483; G06F 40/58; G10L 13/00; G06K 9/4604; G06K 9/48; G06K 9/46; G06K 9/6271; G06K 9/62; G06K 9/00456; G06K 9/00; G06T 7/12; G06T 7/13; H04N 1/40062
See application file for complete search history.

(56) References Cited

U.S. PATENT DOCUMENTS

| | | | |
|---|---|---|---|
| 8,386,265 B2 | 2/2013 | Subramanian et al. | |
| 9,785,834 B2 | 10/2017 | Biswas et al. | |
| 9,992,556 B1 | 6/2018 | Price et al. | |
| 2014/0365675 A1* | 12/2014 | Bhardwaj | H04N 21/8456 709/231 |
| 2016/0117311 A1 | 4/2016 | Maetz et al. | |
| 2019/0156826 A1* | 5/2019 | Cromack | G06F 16/3334 |
| 2019/0313154 A1* | 10/2019 | Baughman | H04N 21/812 |
| 2019/0362402 A1* | 11/2019 | Oh | G06F 40/35 |

(Continued)

OTHER PUBLICATIONS

Affectiva, https://www.affectiva.com/, printed: Aug. 6, 2019, 8 pages.

(Continued)

*Primary Examiner* — Huyen X Vo
(74) *Attorney, Agent, or Firm* — Kelsey M. Skodje

(57) ABSTRACT

Time dependent media (TDM) content is received, and text features and non-text features are extracted from the TDM content. The TDM content is split into two or more documents. A document, which includes non-text features from the extracted non-text features, is selected. Non-text features in the document are compared to context patterns. When a context pattern matches a non-text feature in the document, a context element linked to the context pattern is linked to the non-text feature as well. The TDM content is modified based on the context element.

20 Claims, 5 Drawing Sheets

(56) References Cited

U.S. PATENT DOCUMENTS

2020/0092610 A1* 3/2020 Baughman ......... H04N 21/4532

OTHER PUBLICATIONS

Pasta, "Visualize stress and claim The Voice Emotion Recognition," https://feeling.pas-ta.io/en/, printed: Feb. 11, 2019, 13 pages.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

LINKING CONTEXTUAL INFORMATION TO TEXT IN TIME DEPENDENT MEDIA

BACKGROUND

The present disclosure relates to text mining and, more specifically, to supplementing extracted text with contextual information.

Text mining is used to extract information from machine-encoded text. For example, text mining can be used in applications such as sentiment analysis, lexical analysis, machine translation, speech synthesis, machine learning, etc. Text mining can be used to extract information from static (time independent) text or from time dependent text such as video subtitles, closed captioning, or other real-time text sources.

SUMMARY

Various embodiments are directed to a system that includes at least one processing component, at least one memory component, and a content module configured to receive time dependent media (TDM) content and extract text features and non-text features from the TDM content. The system also includes a division module configured to split the TDM content into multiple documents (e.g., by selecting division points). The division module can also be configured to select at least one document from the documents, and form a document subset from the at least one document. The system also includes a context module, which is configured to select a document from the documents.

Further embodiments are directed to a method that includes receiving time dependent media (TDM) content, and extracting text features and non-text features from the TDM content. The non-text features can be mapped to the text features based on temporal positions. The method also includes splitting the TDM content into multiple documents, and selecting a document from these documents. In some embodiments, division points are selected for splitting the content. The method further includes determining that a context pattern, which is linked to a context element, matches a non-text feature in the document. In some embodiments, the context pattern defines an intonation or a gesture. Additionally, the method includes linking the context element to the non-text feature, and modifying the TDM content based on the context element. In some embodiments, modifying the TDM content can include generating a metadata tag identifying the context element and/or displaying a portion of text in the TDM content in a color assigned to the context element.

Additional embodiments are directed to a computer program product for supplementing text. The computer program product includes a computer readable storage medium having program instructions embodied therewith, the program instructions executable by a processor to cause the device to perform a method. The method includes receiving time dependent media (TDM) content, and extracting text features and non-text features from the TDM content. The non-text features can be mapped to the text features based on temporal positions. The method also includes splitting the TDM content into multiple documents, and selecting a document from the documents. In some embodiments, division points are selected for splitting the content. The method further includes determining that a context pattern, which is linked to a context element, matches a non-text feature from the document. Additionally, the method includes linking the context element to the non-text feature, and modifying the TDM content based on the context element. In some embodiments, modifying the TDM content can include annotating the TDM content and/or generating synthetic speech using the context element and the text features.

DETAILED DESCRIPTION

Figure 1:
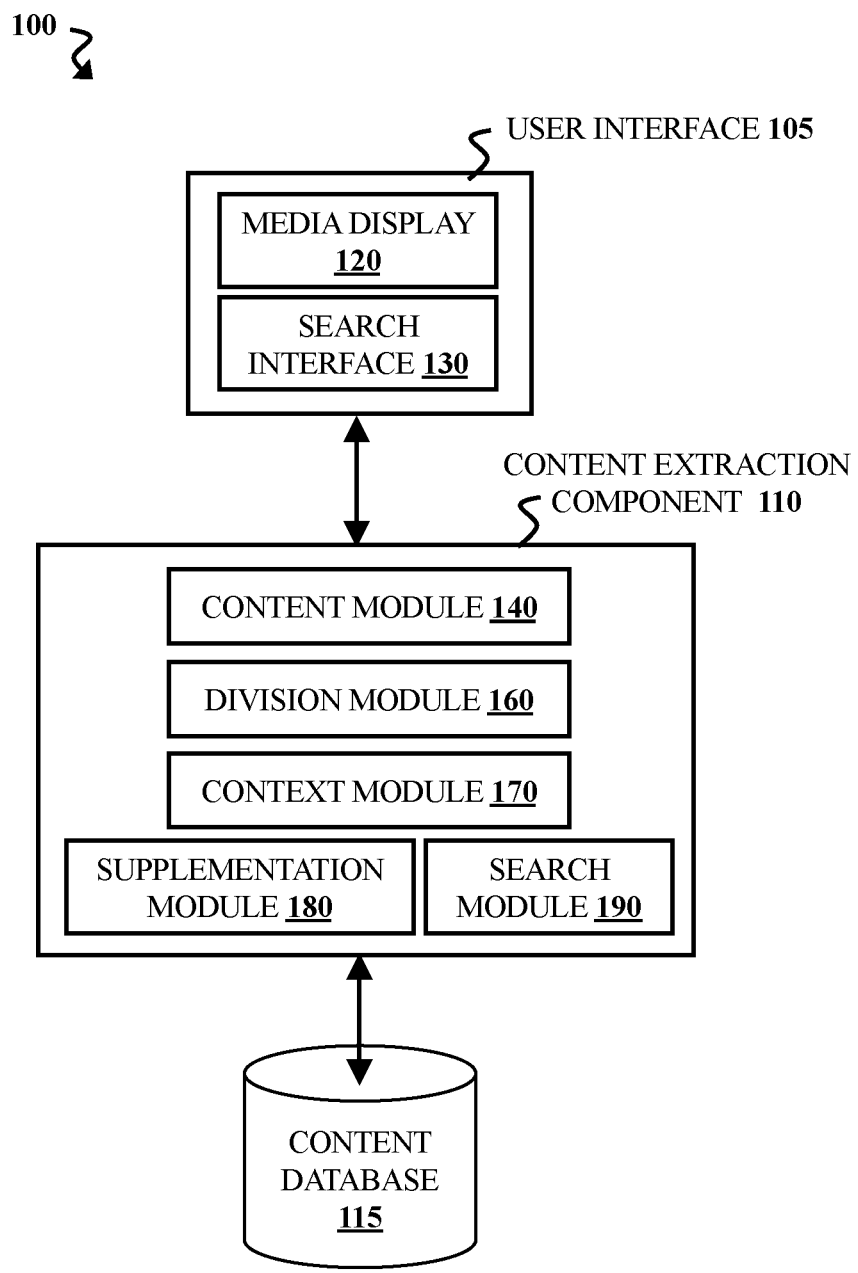
FIG. 1 is a block diagram illustrating a time dependent media (TDM) analysis environment, according to some embodiments of the present disclosure.

Media can be described as "time dependent" or "time independent". Time dependent media (TDM) content is displayed dynamically as continuous media. Examples of TDM include streaming text, audio, and/or video. For example, TDM can be an audiovisual recording of a person speaking. The speech data from the recorded audio can be converted to machine-encoded text using speech-to-text engines, and information can be extracted from the machine-encoded text by text mining techniques. This text can be used for a variety of purposes, such as machine translation or automatically generating transcripts, captions, and summaries. Text mining can also provide keywords that allow users to search TDM content for particular topics, named entities, quotations, etc. However, information obtained from text alone can be inaccurate. Non-text features such as intonation and facial expressions can provide contextual information that would be left out of a simple transcription. For example, variations in spoken pitch (intonation) can completely change the meanings of certain sentences or words.

However, contextual information such as this does not provide keywords for searching TDM content. Therefore, a search such as the aforementioned text-only TDM content search may return inaccurate or incomplete results. Additionally, in techniques such as sentiment analysis, text mining can provide incomplete results because important indicators of sentiment (e.g., intonation, facial expressions, body language, etc.) are left out. Sentiment analysis results can also be inaccurate when non-text indicators contradict or change the meaning of words identified via text mining. Further, identifying non-text features can be time and resource intensive.

Disclosed herein are techniques for supplementing TDM text with contextual information. Text and non-text features are extracted from received TDM content, and mapped to one another based on their temporal positions. The TDM content can be split into multiple documents either arbitrarily or based on information from the extracted content. For example, a movie can be split into different documents for different scenes (e.g., based on automatic identification of changes in setting, people, or music).

Contextual information is obtained from at least one of the documents by identifying patterns in the non-text features (e.g., facial expressions, gestures, intonation, etc.) that match known patterns linked to predefined contextual information (e.g., particular emotions, intentions, emphasis, etc.). Carrying out the pattern matching process on individual documents rather than all received TDM content at once can allow greater efficiency. Additionally, subsets of the documents can be selected for pattern matching, such as subsets of documents in an audiovisual TDM file that contain speech data. Therefore, pattern matching of features such as vocal intonation can be carried out without comparing defined patterns of intonation to irrelevant portions of TDM content (e.g., subsets of documents containing no speech data).

When non-text features that match predefined patterns are identified, these non-text features are linked to the corresponding contextual information. The contextual information is then linked to text features mapped to the identified non-text features. The contextual information is used to supplement the linked text features. For example, contextual information can be incorporated into text visually by changing the appearance of the text according to different contexts. Text supplementation is discussed in greater detail below.

FIG. 1 is a block diagram illustrating a TDM analysis environment 100, according to some embodiments of the present disclosure. The TDM analysis environment 100 includes a user interface 105, a content database 115, and a content extraction component 110. The user interface 105 includes a media display 120 and a search interface 130. The content extraction component 110 includes a content module 140, a division module 160, a context module 170, a supplementation module 180, and a search module 190. In embodiments, the content module 140, division module 160, context module 170, supplementation module 180, and search module 190 can be processor executable instructions that can be executed by a dedicated or shared processor using received inputs. The content database 115 stores TDM files, as well as text and non-text features extracted from the TDM file, where the text features are mapped to the non-text features based on temporal position.

Figure 3:
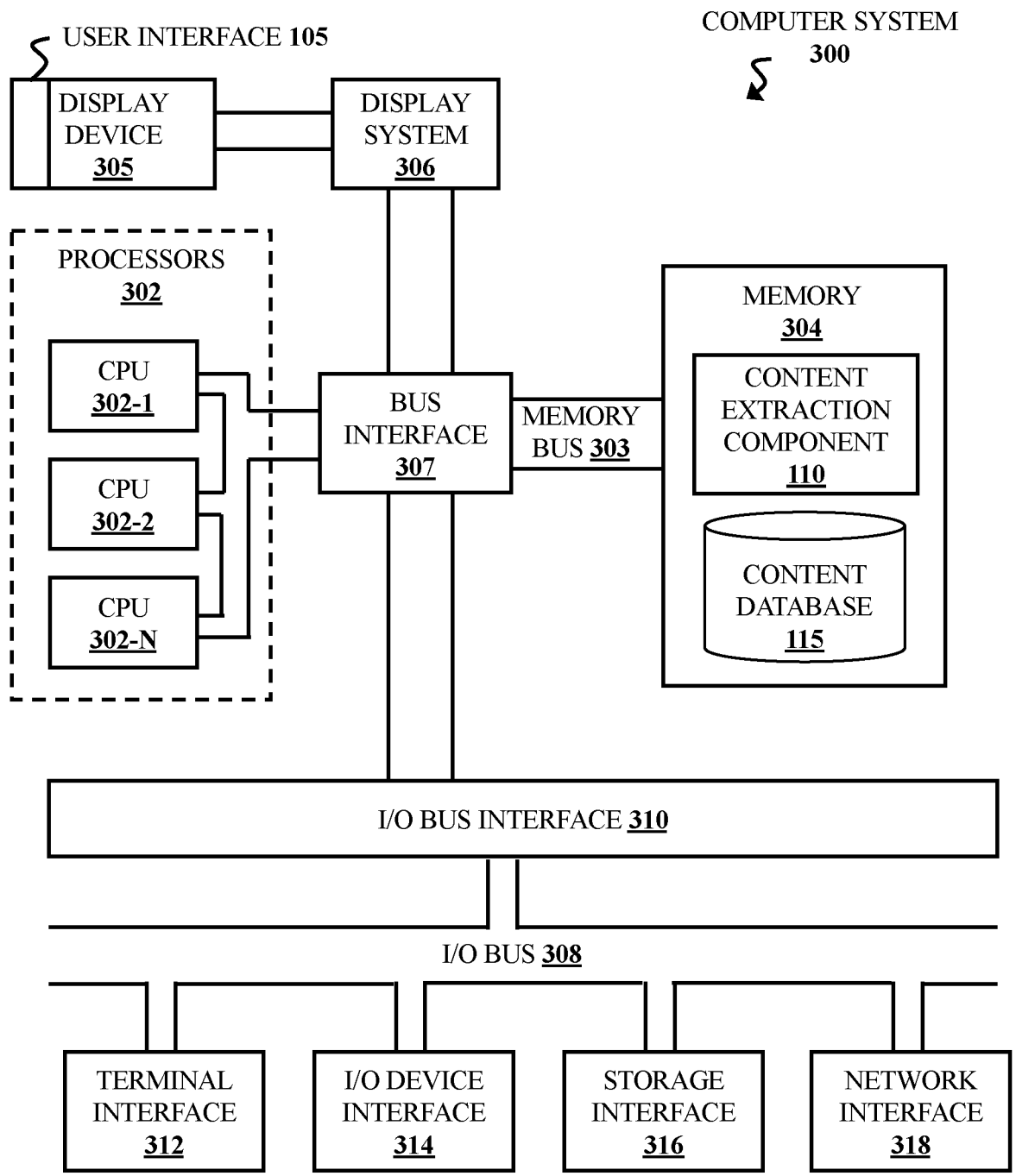
FIG. 3 is a block diagram illustrating a computer system, according to some embodiments of the present disclosure.

The user interface 105 is part of a device that provides visual, audio, or both types of data. An example of a device such as this is illustrated in FIG. 3. In some embodiments, the device is a desktop computer, a laptop computer, a mobile computing device, or a tablet computer. In other embodiments, the user interface 105 is part of a standalone device (e.g., a computer monitor, television, or handheld device display) connected to a display system. The media display 120 is a portion of the user interface 105 that displays time dependent media (TDM) content (e.g., video, audio, graphical images, animation, text and other characters, etc.). Further, the TDM content can be streaming or non-streaming. The media display 120 can also display graphical and/or textual annotations based on contextual information. This is discussed in greater detail below. In some embodiments, the media display 120 can display static media as well (e.g., graphical images, text documents, etc.).

The search interface 130 is a portion of the user interface 105 through which a user can search for TDM files or content extracted from TDM based on text and/or context parameters. The search interface 130 can include any kind of search field. For example, the search interface 130 can include at least one text field, dropdown list, checkbox, toggle, date selection field, etc. The search interface 130 can optionally provide multiple search options, such as at least one text field for entering queries (e.g., keywords, tags, names, etc.) and at least one dropdown list for selecting one or more additional parameters (e.g., category, time range, name of TDM file or document, etc.). The search interface 130 also includes a search results display window. In some embodiments, the search results can include links that, when selected, cause a portion of the TDM (e.g., a video clip or portion of transcribed text) to be displayed on the media display 120. The search results can also include titles, summaries, and/or previews of the TDM portions.

The content module 140 extracts text and non-text (e.g., audio, video, graphical images, etc.) elements from the TDM files. For example, the TDM can be a video of a person speaking. The text features in the video can include machine-encoded text extracted from the audio data by a speech-to-text engine, and the non-text features can include facial expressions, body language, and intonation. The text and non-text features are stored in the content database 115, where they are mapped to one another based on temporal position. In some embodiments, the text includes machine-encoded text pre-associated with the TDM file. For example, the content module 140 can extract text features from source texts associated with audio and/or video data (e.g., a book or script, a transcript, a translation, captions, etc.). Text features can be obtained via natural language processing, though any appropriate text mining techniques can be used (e.g., lexical analysis, pattern recognition, sentiment analysis, etc.).

The content module 140 can also extract features from text obtained by converting characters detected in video frames or other graphical images to machine-encoded text using techniques such as optical character recognition (OCR) or intelligent character recognition (ICR). For example, the content module 140 can identify text printed on an inanimate object (e.g., a billboard, presentation slide, labeled container, or book cover) in a video frame. Speech data from extracted audio content can also be converted into machine-encoded text by at least one speech-to-text engine. The speech-to-text decoding can be carried out using a variety of techniques (e.g., artificial neural networks, convolutional neural networks, statistical modeling, Hidden Markov Models (HMMs), lattice-based analysis, entropy-based speech segmentation algorithms, CMUSphinx, etc.).

The content module 140 extracts non-text features from TDM content such as audio data and graphical images (e.g., images in video frames). The non-text features can be extracted based on identification of faces and other animate or inanimate objects, acoustic features (e.g., voiceprints, speech delivery elements, non-verbal vocalizations, background noises, music, etc.), gestures and other body language, object positions, shapes, colors, movements, etc. Examples of techniques that can be used to extract non-text features from images can include region-based convolutional neural networks (R-CNN), scale-invariant feature transform (SIFT), real-time object detection techniques, pattern detection, edge/contour/ridge detection, histogram analysis, etc. Techniques for facial detection and facial expression identification (e.g., from sets of facial muscle movements) can also be used. Non-text features can be extracted from audio data by measuring acoustic features such as pitch, amplitude, cadence, rhythm, and volume. Additional acoustic features that can be extracted from speech data can include pause-to-word ratio, mean pause duration, and phonation rate.

The division module 160 can split TDM content into multiple documents. This allows content extraction to be carried out on smaller amounts of data, thereby reducing the amounts of time and system resources necessary for analysis of the TDM content. The division module 160 selects division points for generating documents based on various criteria. For example, division points can be based on predefined portions of the TDM file, such as chapters in an audiobook, predefined scenes in a movie, slides in a presentation, educational technology modules, etc. However, the division module 160 can use other criteria for selecting division points as well (e.g., preset document size thresholds).

In some embodiments, division points are selected based on information extracted by the content module 140. This information can include attributes (e.g., locations, topics, chapters, speakers, etc.) identified in the extracted TDM content. For example, the division module 160 can select division points in a video by determining that there has been a scene change (e.g., based on video or audio data). Scene classification techniques that can be used can include convolutional neural networks (CNNs), multiscale CNNs, deep random-scale stretched CNNs, unsupervised adversarial domain adaptation, etc.

Scenes can be identified based on image content (e.g., objects, colors, etc.) in the extracted video frames. From the image content, the division module 160 can determine that sets of video frames depict different locations, and documents can be generated for scenes set in each location. Each document can contain a set of consecutive frames depicting one location. For example, documents can be generated for an indoor location (e.g., based on identification of colors and/or objects such as furniture), an outdoor location (e.g., based on identification of colors and/or objects such as trees), sets of consecutive frames depicting people (e.g., any person, a specific person, or groups of people), etc.

The division module 160 can also select division points based on audio content. For example, different documents can be generated for portions of audio data that include speech data and portions that do not include speech data. For example, an audio recording can contain three portions with speech data (speech A, speech B, and speech C) and two portions without speech data: background A and background B. The audio data can include these portions in the following order: speech A, background A, speech B, background B, speech C. The division module 160 can generate a document for each portion in some embodiments. In other embodiments, the division module 160 can generate two documents, one containing all three speech portions and one containing both background portions.

However, various alternative division points can be selected. For example, different documents can be generated for different speakers. Continuing the aforementioned example, the division module 160 can determine that speech A contains speech data from two different speakers. The division module 160 can then generate two documents for speech A, each document containing speech data from a different speaker. The division module 160 can also locate keywords in machine-encoded text extracted from the audio data, and split the TDM file into documents containing different topics. In some embodiments, the division module 160 can also group documents into document subsets according to various criteria (e.g., documents containing text, documents containing speech data, etc.). Document subsets are discussed in greater detail with respect to FIG. 2.

The context module 170 compares non-text features from a document to a set of context patterns linked to context elements (e.g., contextual information such as specific meanings or associations). If a context pattern and non-text feature are determined to be a match (e.g., having a similarity value above a threshold similarity value), the context module 170 links non-text feature to the context element corresponding to the matching context pattern. In some embodiments, machine learning techniques can be used to update context patterns to further define non-text features linked to the corresponding context element. The context elements are used by the supplementation module 180 to supplement (e.g., annotate, visually modify, translate, etc.) a linked text feature. A linked text feature is a text feature mapped to the matching non-text feature based on temporal position within the TDM content. Supplementation of text and non-text features is discussed in greater detail below.

The context patterns include a set of context patterns from a dictionary or database of known patterns. In some embodiments, the set of context patterns is a predefined dictionary. However, the dictionary can optionally be trained on frequently used text features (e.g., frequently used words and phrases) and non-text features (e.g., images of a specific face to be analyzed using facial expression recognition techniques; acoustic features associated with a particular voice, accent, or language; acoustic features of common background noises, etc.). There can optionally be profiles for different speakers, faces, locations, etc. associated with different dictionaries. The context patterns can be stored in the content database 115 or in another database.

Examples of context patterns can include sets of acoustic units of speech (e.g., sets of specific patterns of pitch, amplitude, cadence, etc.), which are referred to herein as "vocal context patterns". Vocal context patterns can be linked to context elements associated with particular emotions (e.g., excitement, contentedness, surprise, etc.), intentions (e.g., irony, concern, curiosity), or other mental/physical states (e.g., exhaustion). For example, in English, a text feature such as the word "cool" can refer to temperature, but it can sometimes mean "excellent" in informal contexts. If a non-text feature (e.g., a group of acoustic units) mapped to "cool" matches a vocal context pattern linked to a context element specifying an emotion such as excitement, the context module 170 can link the context element for excitement to the text feature, which can indicated that "cool" is being used in the latter sense as an exclamatory phrase.

Vocal context patterns can also be linked to context elements for emphasis (e.g., groups of acoustic units such as specific pitch variation patterns), which can be used to identify which words and/or syllables are emphasized within a spoken phrase. Matching a non-text feature to a context pattern linked to a context element such as "emphasis" can allow differentiation between text features that change their meaning when spoken with different intonations. For example, the phrase "she isn't traveling tomorrow" can be spoken without special emphasis, in which case the meaning of the phrase does not change the meaning identified based on the text alone. However, differences in meaning can be identified when emphasis is linked to different words in the phrase. For example, the phrase can be: "she isn't traveling tomorrow" or "she isn't traveling tomorrow," where the italicized words are linked to context elements for emphasis. When the context element for emphasis is linked to the word "she", this can indicate that a different person will be traveling. Alternatively, when the context element for emphasis is linked to the word "tomorrow", this can indicate that the travel will occur on a different day.

Context patterns can include sets of non-vocal acoustic units. For example, there can be musical context patterns linked to specific notes or groups of notes, specific instruments or genres, etc. Musical context patterns can also be linked to context elements such as locations, emotions, scenes, etc. For example, a context pattern associated with a musical genre or instrument common in, or unique to, a particular location can be linked to a context element specifying this location. In another example, a musical context pattern indicating a minor key can be linked to an emotion such as sadness. Further, a context pattern associated with music playing during a specific scene in a movie can be linked to the scene.

Further, context patterns can include graphical image data. For example, when faces are depicted in still images or videos, context patterns can include facial expressions linked to particular meanings. Facial expression recognition can be carried out using the Facial Action Coding System (FACS), which can identify more than forty independent movements ("action units") of facial musculature. In these instances, context patterns can include sets of action units that define facial expressions, which are linked to context elements indicating their meanings. For example, a set of action units can be linked to a context element indicating a mental state such as confusion. A variety of action unit context patterns can be included in the set of context patterns. For example, there can be patterns of action units for expressions linked to context elements such as frustration, calmness, happiness, focus, etc.

Image-based context patterns can also define various gestures, movements, inanimate objects, colors, etc. A variety of image recognition techniques can be used to identify these patterns. Image recognition techniques are discussed in greater detail above. In some embodiments, context patterns associated with body language (e.g., gestures, postures, hand signals, etc.) can be linked to particular meanings. For example, a nod of the head can be linked to an affirmative expression (e.g., "yes" or "okay"). Additionally, movements associated with hand waving can be linked to salutatory and/or valedictory expressions.

The supplementation module 180 modifies how TDM content is presented in order to convey contextual information from context elements. Text features mapped to non-text features are supplemented based on information from the non-text features' linked context elements. In some embodiments, the supplementation module 180 visually modifies TDM content. This can include adding annotations to text (e.g., subtitles, transcripts, translations, etc.). For example, depending on the identified context elements, a phrase such as "a cool house" could be displayed as "a cool (positive descriptor) house" or "a cool (temperature) house". In other embodiments, this text could be displayed as "a cool (excellent) house" or "a cool (cold) house". Additionally, the text could be modified to replace the word "cool" with these parenthetical phrases. In instances when there is ambiguity as to the meaning of a word, the word could be displayed without modification or with an annotation indicating the ambiguity (e.g., "cool (ambiguous)" or "cool (positive descriptor or temperature)").

In another example, subtitles (text features) accompanying a video can be displayed on the media display 120 in different colors. The colors can be selected based on context elements linked to non-text features mapped to the subtitles. The context elements can be related to emotions (e.g., happiness or sadness), and the supplementation module 180 can identify colors assigned to different emotions (e.g., yellow for happiness and blue for sadness) in the content database 115. The subtitle colors can then be modified according to the assigned colors. For example, the supplementation module 180 can generate yellow and blue subtitles for text corresponding to context elements for happiness and sadness, respectively.

The supplementation module 180 can also apply color changes such as these to other text displays, such as a transcript of audio data. Additionally, the supplementation module 180 can convey contextual information using other visual elements on the media display 120, such as by inserting ideograms (e.g., pictograms, emojis, emoticons, etc.), printing selected words in italics or boldface, underlining or highlighting selected text or shapes, etc.

Further, extracted text can be converted into synthetic speech using one or more text-to-speech engines. The supplementation module 180 can then modify acoustic features of the synthetic speech to convey emotions and/or intentions (e.g., emphasis, affirmation, disagreement, etc.) based on linked context elements. The user interface 105 can also include a computer-generated figure (e.g., a human, an anthropomorphic animal, etc.) that is animated to deliver the synthetic speech. In these instances, the computer-generated figure can be animated to include facial expressions and/or other body language features that help convey these emotions and intentions.

In instances where text extracted from TDM is translated from one language to another, the supplementation module 180 can optionally modify the translation based on context elements linked to words and/or phrases in the original text. In some embodiments, the meaning of an ambiguous or untranslatable word can be estimated based on context elements such as intonation, gestures, and/or facial expressions. In the above example in which the word "cool" is interpreted to mean "excellent" based on context elements, the inaccuracy that would be caused by a literal translation of "cool" into a temperature descriptor can therefore be prevented.

Further, the supplementation module 180 can generate annotations (e.g., in text boxes) providing contextual information about elements of the TDM content. These annotations can be automatically displayed on the media display 120 with the TDM content. However, a user can also indicate (e.g., by selecting an "annotation" option on the user interface 105) whether or not to display annotations. In some embodiments, a user can select specific annotations. For example, when the media display 120 displays text, text features (e.g., titles, paragraphs, sentences, individual words, etc.) that have supplemental annotations can be indicated by highlighting the supplemented text features, displaying the supplemented text features in a different color than the rest of the text, adding a superscripted number or symbol, etc. Available annotations associated with still images, videos, and text can also be indicated by the presence of icons (e.g., shapes, cartoons, etc.) on the media display 120. When a user selects an annotation indicator, such as by clicking on or hovering a cursor over an appropriate icon or text feature, the annotation can appear (e.g., as a pop-up message, speech balloon, text box, etc.) on the media display 120 or another area of the user interface 105.

The supplementation module 180 can also generate metadata tags identifying context elements mapped to extracted text and non-text features in the content database 115. For example, a text feature can be tagged with a keyword indicating an emotion or attitude. In some embodiments, text mining processes such as sentiment or lexical analyses are carried out on the TDM content. The keywords can allow identification of text features relevant to the analysis that would not be located by mining text that was not supplemented by contextual information.

Additionally, the metadata tags can allow a user to locate, via the search interface 130 and search module 190, particular TDM content based on context elements. For example, a user can enter search terms related to elements such as particular emotions, locations, inanimate objects, faces, music, etc. into the search interface 130. Examples of search parameters that can be entered via the search interface 130 in combination with a context-based search are discussed in greater detail above.

When a user enters a context-based search term into the search interface 130, the search module 190 searches for metadata tags matching (e.g., exactly matching or above a threshold similarity value) the context-based search terms. For example, a user can select a particular TDM file such as a movie, and enter a search term such as "happy scenes" into the search interface 130. The search module 190 can then locate portions of the movie that are tagged with metadata tags identifying context elements associated with happiness in the content database 115.

The portions of the TDM content located by the search module 190 can be displayed on the user interface 105. For example, a located portion of the aforementioned movie can automatically begin playing on the media display 120. Alternatively, a list of search results can be displayed on the media display 120, search interface 130, or another part of the user display 105. The search results can be displayed in any appropriate format (e.g., scene titles, descriptive summaries or captions, thumbnail images, etc.).

In some embodiments, the search module 190 generates a list of content elements tagged with particular metadata tags. For example, the search module 190 can generate a list of words and phrases tagged with metadata tags associated with affirmative or positive statements (e.g., "useful", "best", "thank you", "sounds good", "best wishes", etc.). The list can be displayed on the user display 105. The display 105 can also provide metrics such as a number of occurrences for each content element on the list and/or various statistical values (e.g., percent affirmative/positive statements out of the total number of content elements in a document, percent similarity of each word or phrase on the list to the search term, etc.).

Figure 2:
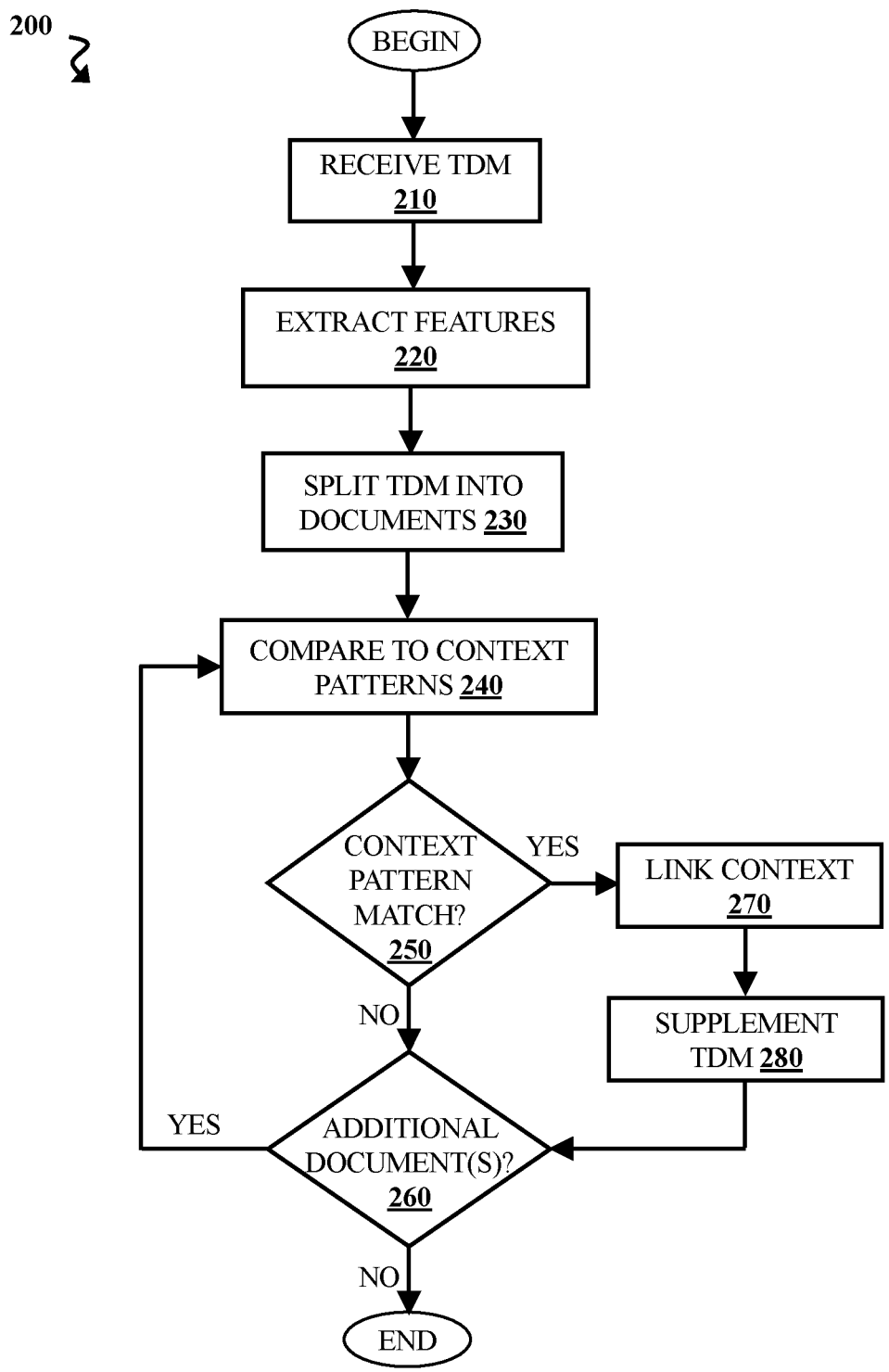
FIG. 2 is a flow diagram illustrating a process of supplementing TDM text based on contextual information, according to some embodiments of the present disclosure.

FIG. 2 is a flow diagram illustrating a process 200 of supplementing TDM text based on contextual information, according to some embodiments of the present disclosure. To illustrate process 200, but not to limit embodiments, FIG. 2 is described within the context of the TDM analysis environment 100 of FIG. 1. Where elements shown in FIG. 2 are identical to elements shown in FIG. 1, the same reference numbers are used in both Figures.

Process 200 begins when TDM content is received. This is illustrated at step 210. Examples of TDM content can include movies and television programs, multimedia presentations, recorded or computer-generated speech, music, animated and/or computer-generated graphics. The TDM can also include streaming text (e.g., subtitles or real-time generated text). In some embodiments, the content module 140 receives a complete TDM file. TDM files can include various types of digital content (e.g., video, graphical image, animation, audio, and/or text), and can be encoded in accordance with any appropriate file format standard, such as Audio Video Interleave (AVI), Waveform Audio (WAV), Animation (ANI), Audio Interchange File Format (AIFF), Graphics Interchange Format (GIF), Motion Picture Experts Group (MPEG, e.g., MPEG-4), 8-Bit Sampled Voice (8SVX), etc.

However, the received TDM content can also be a selected portion of a TDM file. For example, a user can select, via the user display 105, one or more specific sections of TDM content (e.g., chapters, scenes, a range of temporal positions, a set of frames, etc.) from which contextual information is to be extracted. The type of data from which to extract contextual information can also be user-selected or preset. For example, in some embodiments the content module 140 receives only audio data from TDM content that includes both audio and video data.

Text and non-text features are then extracted from the TDM content. This is illustrated at step 220. Text features can be extracted from any text associated with the TDM content. In some embodiments, the text is extracted from captions and/or subtitles. For example, the TDM content can include audiovisual data accompanied by subtitles (e.g., for dialogue, narration, song lyrics, etc.) and/or descriptive information. The descriptive information can include text identifying non-verbal vocalizations (e.g., cheering, yawning, sneezing, etc.), other sounds (e.g., music, sirens, thunder, etc.), characters, locations, and/or languages. Additionally, text features can be extracted from speech data that has been converted to machine-encoded text. Text features can also be extracted by converting characters detected in graphical images to machine-encoded text. These graphical images can include video frames from the TDM content. Each frame is a portion of the TDM (a "snapshot") that corresponds to a particular temporal position. Additional examples of text extraction are discussed in greater detail with respect to FIG. 1.

Non-text features are extracted from audio and/or visual data. For example, video frames in TDM content can include graphical representations of inanimate objects (e.g., buildings, furniture, devices, foliage, geological features, windows, doors, walls, etc.), animate objects (e.g., people, animals, cartoon characters, etc.), and other features (e.g., numbers, letters, punctuation, lines, arrows, two- or three-dimensional shapes, etc.). Non-text features can include visual elements such as size, shape, topographical features, and colors. Visual elements can be extracted using any appropriate image-recognition techniques (e.g., pattern detection, facial recognition, edge/contour/ridge detection, histogram analysis, etc.). Audio elements can be extracted by measuring acoustic features (e.g., volume, pitch, amplitude, cadence, rhythm, pause-to-word ratio, mean pause duration, phonation rate, etc.).

The TDM content is split into documents. This is illustrated at step 230. The division module 160 selects division points in the TDM content, and generates documents based on these division points. In some embodiments, the division points are selected based on content extracted at step 220. For example, when the TDM content includes video data, the division module 160 can generate documents for portions of the video (e.g., scenes in a movie) based on identification of features such as particular animate and/or inanimate objects, specific locations, specific people, etc. in the video frames.

Portions or scenes can also be differentiated using audio analysis techniques to identify music (e.g., melodic changes that indicate changes in music between scenes), voices, background sounds (e.g., indicating changes in setting such as from urban to rural), etc. Examples of division points based on speech data and image data are discussed in greater detail with respect to FIG. 1. Further, the division module 160 can split the TDM content into documents related to different topics in some embodiments. For example, the division module 160 can identify different topics based on keywords from text accompanying the TDM content (e.g., the original text of an audiobook, a script for an episode of a television program, subtitles, captions, etc.), section titles, machine-encoded text generated using speech-to-text engines or OCR, presentation slides, etc.

The division module 160 can also determine division points based on criteria other than information extracted by the content module 140 in some embodiments. For example, division points can be determined according to arbitrary document size selections, preset division points (e.g., chapters in an audiobook), etc. Further, in some embodiments the TDM file is not split into more than one document. For example, if a TDM file size is below a minimum document size threshold, the TDM file can be stored as a single document.

In some embodiments, the division module 160 also selects one or more documents to form a document subset. For example, the TDM content can be a movie that has been split into ten documents (documents 1-10), where documents 1-4 and 6-9 contain speech data and documents 3-6 contain images of people. The division module 160 can assemble a document subset for the eight speech data documents and/or a document subset for the four documents with images of people. However, the division module 160 can form other document subsets as well, such as a document subset containing both speech data and images of people (documents 3-4 and 6) and/or a document subset containing neither speech data nor images of people (document 10).

The division module 160 can assemble document subsets according to user-input directions. For example, a TDM audio file can be split into four documents, two of which contain speech data and two of which contain only instrumental music. A user can then select an option for forming a subset, such as for forming a subset containing documents with speech data. In some embodiments, the division module 160 can automatically assemble document subsets according to user-input or preset categories (e.g., music and speech). In other embodiments, no subsets are formed.

A document is then selected from the generated documents, and the selected document's extracted non-text features are compared to context patterns. This is illustrated at step 240. In some embodiments, the context module 170 can select any document. However, the document can also be selected from a subset of documents assembled by the division module 160. In these instances, the document subset can be selected by a user, or automatically selected based upon a selected category (e.g., documents containing music, particular locations, speech, etc.). For example, a TDM file containing video and audio data (e.g., a movie) can be split into multiple documents, some of which contain speech data, and the documents containing speech data can be a document subset. In instances where the text features have been extracted from the speech data, the context module 170 can select a document from this subset.

The context module 170 then compares non-text features in the selected document to context patterns from a dictionary or database of known patterns. The set of context patterns can be a predefined dictionary and/or a dictionary trained on frequently used text and non-text features. The context patterns can define sets of acoustic units of speech and/or other sounds. Acoustic units can include measures of pitch, amplitude, cadence, etc. The context patterns can also define image data, such as colors, shapes, faces, movements, sets of FACS action units, etc. Each context pattern is linked to a context element. Context elements indicate specific meanings or associations (e.g. specific emotions, intentions, people, locations, etc.). For example, a context element for an emotion such as enthusiasm can be linked to a context pattern defining a specific set of acoustic units of pitch (e.g., a specific intonation) can be linked to a context element for an emotion, such as enthusiasm.

A variety of similarity measuring techniques can be used to compare context patterns and non-text features from the selected document. Examples of these techniques can include artificial neural networks, convolutional neural networks, pre-trained recurrent neural network (RNN) classifiers, supervised machine learning algorithms, semi-supervised machine learning algorithms, unsupervised machine learning algorithms, shape recognition algorithms, cross correlation, dynamic time warping (DTW) algorithms, HMMs, etc. The algorithms selected can depend upon the type of features being compared (e.g., shapes or acoustic units), as will be understood by a person of ordinary skill in the art.

Based on the comparisons, it is determined whether one or more context patterns match non-text features from the selected document. This is illustrated at step 250. In some embodiments, a context pattern is identified by the context module 170 as matching a non-text feature when the similarity between them is greater than a threshold similarity, such as a threshold percent similarity (e.g., 80%, 90%, or 95% similar). In other embodiments, the non-text features can be ranked according to similarity to a context pattern. The non-text feature with the closest similarity to this context pattern can then be identified as a match.

If no context patterns matching non-text features are identified at step 250, it is determined whether there are additional documents in the received TDM content or selected document subset. This is illustrated at step 260. If there are remaining documents in the TDM content or document subset, or if a next document subset is selected from the TDM content, process 200 returns to step 240. At step 240, the context module 170 selects a next document for comparison to the context patterns in the content database 115. However, if no documents remain, process 200 ends.

If at least one context pattern that matches a non-text feature is identified at step 250, a context element corresponding to the context pattern is linked to the matching non-text feature. This is illustrated at step 270. In some embodiments, a context pattern is linked to more than one context element. For example, a context pattern defining a set of FACS action units can be linked to context elements identifying a defined facial expression (e.g., a smile) and an associated emotion (e.g., happiness). In this example, the context module 170 can link a non-text feature having a matching set of FACS action units to these context elements. The context module 170 can optionally update the context pattern to define both the original set of FACS action units and the matching non-text feature. The updated context pattern can be stored in the content database 115, and compared to non-text features in subsequent documents.

The TDM content is then supplemented by contextual information. This is illustrated at step 280. The supplementation module 180 identifies text features mapped to non-text features with linked context elements. The supplementation module 180 then modifies the TDM content to convey contextual information associated with the text features. The modification is based on the context elements linked to the mapped non-text features. For example, text can be colored to represent emotion-based context elements. Further, computer-generated figures delivering speech synthesized from the text features can be animated to display body language corresponding to the text features. Additionally, TDM content can be tagged with keywords related to corresponding context elements, allowing users to search for TDM content based on non-text features through the search interface 130. Supplementation of the TDM content is discussed in greater detail with respect to FIG. 1.

After supplementation of the TDM content at step 280, process 200 proceeds to step 260, where it is again determined whether there are additional documents in the received TDM content or selected document subset. If there are remaining documents in the TDM content or document subset, or if a next document subset is selected from the TDM content, process 200 returns to step 240. At step 240, the context module 170 selects a next document for comparison to the context patterns in the content database 115. However, if no documents remain, process 200 ends.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains a content extraction component 110 and a content database 115 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the content extraction component 110 and the content database 115 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the content extraction component 110 and the content database 115 include instructions that execute on the processor 302 or instructions that are interpreted by instructions that execute on the processor 302 to carry out the functions as further described in this disclosure. In another embodiment, the content extraction component 110 and the content database 115 are implemented in hardware via semiconductor devices, chips, logical gates, circuits, circuit cards, and/or other physical hardware devices in lieu of, or in addition to, a processor-based system. In another embodiment, the content extraction component 110 and the content database 115 include data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305, which includes a user interface 105 for viewing time dependent media (TDM). The user interface 105 includes a media display 120 and a search interface 130 (FIG. 1). The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
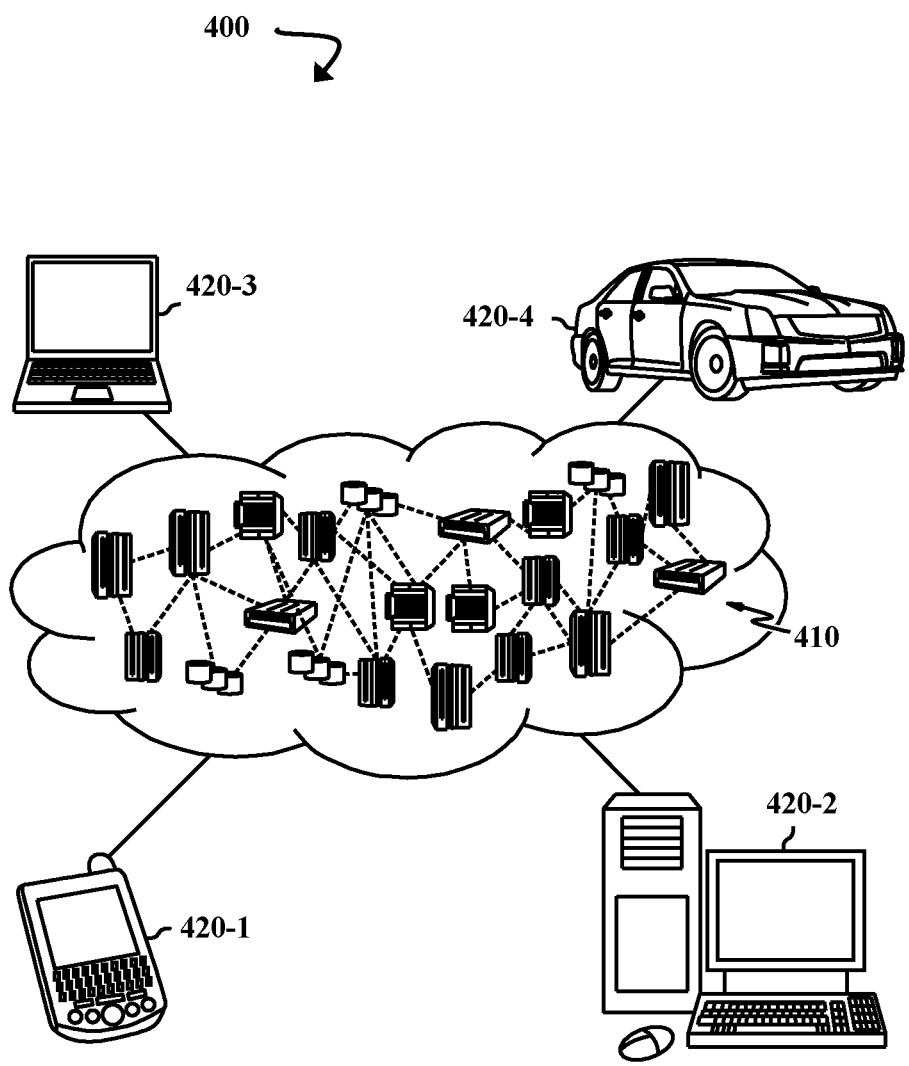
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
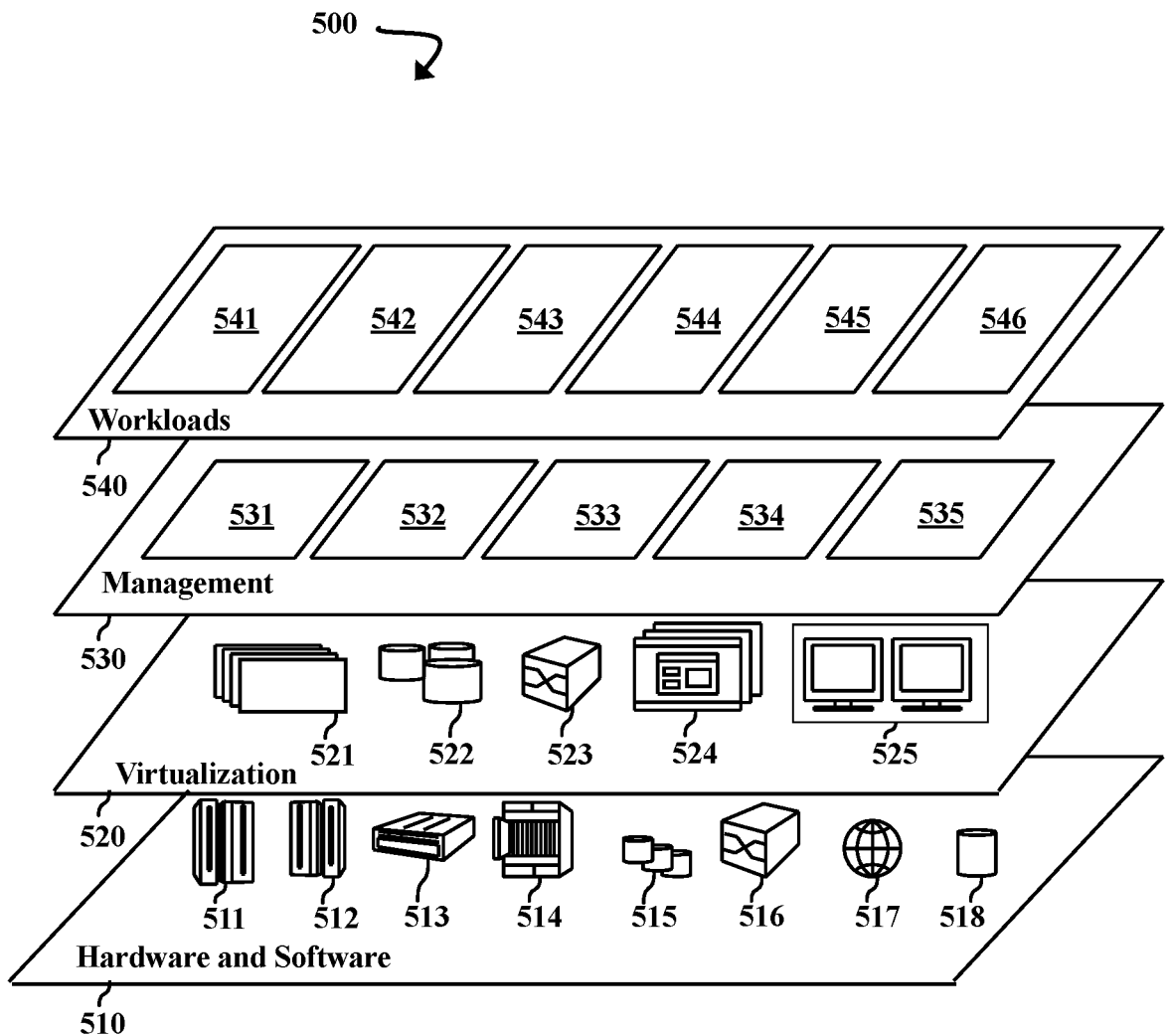
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and supplementing text with contextual information 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
at least one processing component;
at least one memory component communicatively coupled to the at least one processing component, wherein the at least one processing component is configured to perform a method comprising;
receiving time dependent media (TDM) content;
extracting text features and non-text features from the TDM content;
splitting the TDM content into two or more documents;
selecting a document from the two or more documents, wherein the document includes at least one non-text feature from the non-text features;
comparing the at least one non-text feature to context patterns;
determining that a context pattern of the context patterns matches a non-text feature from the at least one non-text feature, wherein the context pattern is linked to a context element;
linking the context element to the non-text feature; and
modifying the TDM content based on the context element.

2. The system of claim 1, wherein the method further comprises:
selecting at least one document from the two or more documents;
forming a document subset from the at least one document; and
selecting the document from the document subset.

3. The system of claim 1, wherein the method further comprises selecting division points in the TDM content.

4. The system of claim 1, wherein the context pattern defines a set of acoustic units.

5. The system of claim 1, wherein the context pattern defines a facial expression.

6. The system of claim 1, further comprising a content database.

7. The system of claim 1, further comprising a user interface.

8. The system of claim 7, wherein the user interface comprises a media display and a search interface.

9. A method, comprising:
receiving time dependent media (TDM) content;
extracting text features and non-text features from the TDM content;
splitting the TDM content into two or more documents;
selecting a document from the two or more documents, wherein the document includes at least one non-text feature from the non-text features;
comparing the at least one non-text feature to context patterns;
determining that a context pattern of the context patterns matches a non-text feature from the at least one non-text feature, wherein the context pattern is linked to a context element;
linking the context element to the non-text feature; and
modifying the TDM content based on the context element.

10. The method of claim 9, wherein the splitting the TDM content comprises:
selecting division points in the TDM content; and
splitting the TDM content into the two or more documents at the division points.

11. The method of claim 9, wherein the non-text features are mapped to the text features based on temporal positions.

12. The method of claim 9, wherein the context pattern defines an intonation.

13. The method of claim 9, wherein the context pattern defines a gesture.

14. The method of claim 9, wherein the modifying comprises generating a metadata tag identifying the context element.

15. The method of claim 9, wherein the modifying comprises displaying a portion of text in the TDM content in a color assigned to the context element.

16. A computer program product for supplementing text, the computer program product comprising a computer readable storage medium having program instructions embodied therewith, the program instructions executable by a processor to cause the device to perform a method, the method comprising:
- receiving time dependent media (TDM) content;
- extracting text features and non-text features from the TDM content;
- splitting the TDM content into two or more documents;
- selecting a document from the two or more documents, wherein the document includes at least one non-text feature from the extracted non-text features;
- comparing the at least one non-text feature to context patterns;
- determining that a context pattern of the context patterns matches a non-text feature from the at least one non-text feature, wherein the context pattern is linked to a context element;
- linking the context element to the non-text feature; and
- modifying the TDM content based on the context element.

17. The computer program product of claim 16, wherein the modifying comprises annotating the TDM content.

18. The computer program product of claim 16, wherein the modifying comprises generating synthetic speech using the context element and the text features.

19. The computer program product of claim 16, wherein the splitting the TDM content comprises:
- selecting division points in the TDM content; and
- splitting the TDM content into the two or more documents at the division points.

20. The computer program product of claim 16, wherein the non-text features are mapped to the text features based on temporal positions.

* * * * *